United States Patent [19]

Morohashi et al.

[11] 4,437,918
[45] Mar. 20, 1984

[54] METHOD OF MAKING A CARPET TILE

[75] Inventors: Kazuo Morohashi, Yokohama; Teruo Kajikawa, Yokosuka; Sakuya Iwai, Tokyo, all of Japan

[73] Assignee: Nippon Oil Company, Japan

[21] Appl. No.: 469,296

[22] Filed: Feb. 24, 1983

Related U.S. Application Data

[63] Continuation of Ser. No. 254,044, Apr. 14, 1981, abandoned.

[30] Foreign Application Priority Data

Apr. 25, 1980 [JP] Japan .................................. 55-51654
May 10, 1980 [JP] Japan .................................. 55-61235

[51] Int. Cl.³ ........................ B32B 31/08; B32B 31/26
[52] U.S. Cl. ..................................... 156/322; 156/242; 156/243; 156/250; 156/324; 226/15; 226/18; 226/19; 226/180; 226/189; 226/198
[58] Field of Search ................... 156/60, 72, 242, 243, 156/250, 309.9, 311, 322, 324; 226/18, 19, 20, 21, 180, 189, 198

[56] References Cited

U.S. PATENT DOCUMENTS

| 1,541,190 | 6/1925 | Smith | 226/189 |
| 2,735,630 | 2/1956 | Ziebolz | 226/19 |
| 2,752,657 | 7/1956 | Meneo | 226/180 |
| 2,827,809 | 3/1958 | Beam | 226/19 |
| 3,107,036 | 10/1963 | Richards et al. | 226/180 |
| 3,177,751 | 4/1965 | Vercauteren | 226/19 |
| 3,554,423 | 1/1971 | Alexeff | 226/19 |
| 3,728,182 | 4/1973 | Wisotzky et al. | 156/322 |
| 4,007,865 | 2/1977 | Crandall | 226/180 |

*Primary Examiner*—Caleb Weston
*Attorney, Agent, or Firm*—McGlew and Tuttle

[57] ABSTRACT

A method of making a carpet tile in which a carpet fed from a carpet feed section, a thermoplastic backing composition layer, and a secondary backing fabric fed from a secondary backing fabric feed section are laminated to form a carpet belt material, and the carpet belt material is cooled and cut to size. In the aforesaid method, the carpet is passed through a roll guider, and the secondary backing fabric is passed through a cloth guider, and, if required, through an expander roll. In the aforesaid methods, the secondary backing fabric is further preheated.

2 Claims, 12 Drawing Figures

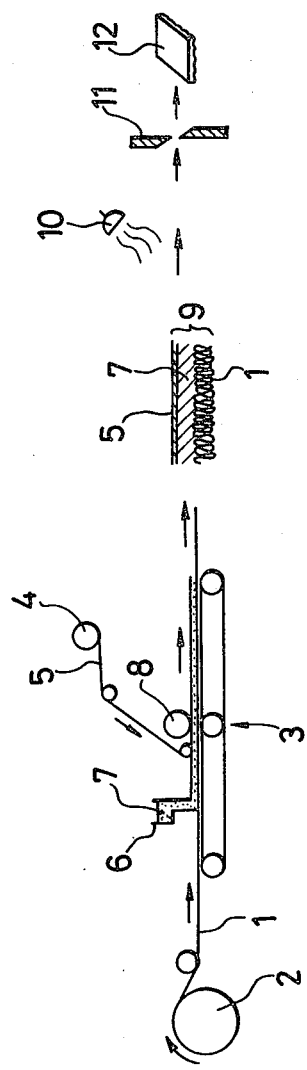
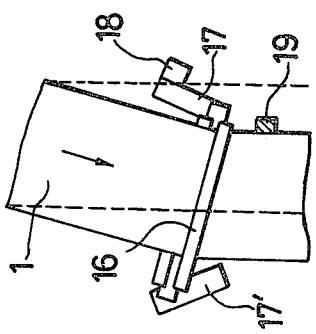
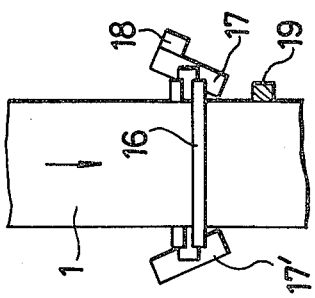
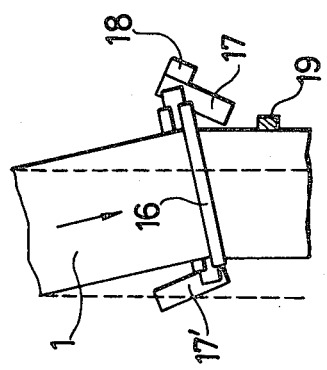
FIG. 1
FIG. 4a
FIG. 4b
FIG. 4c

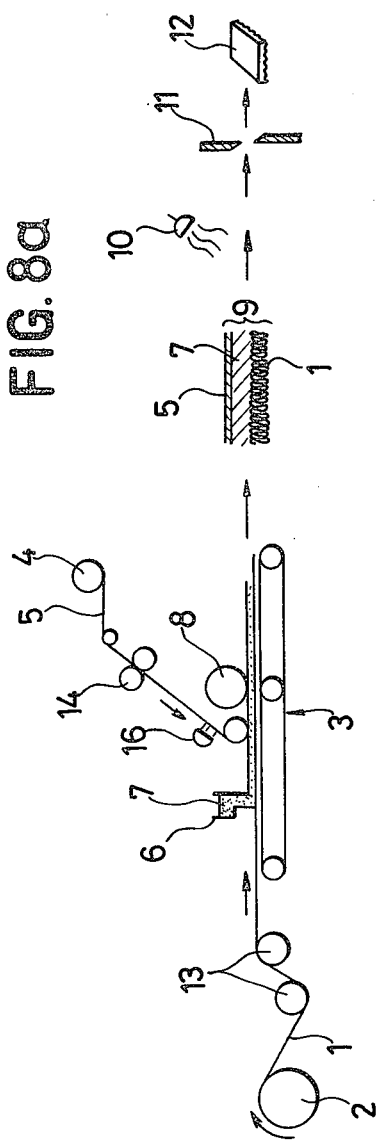
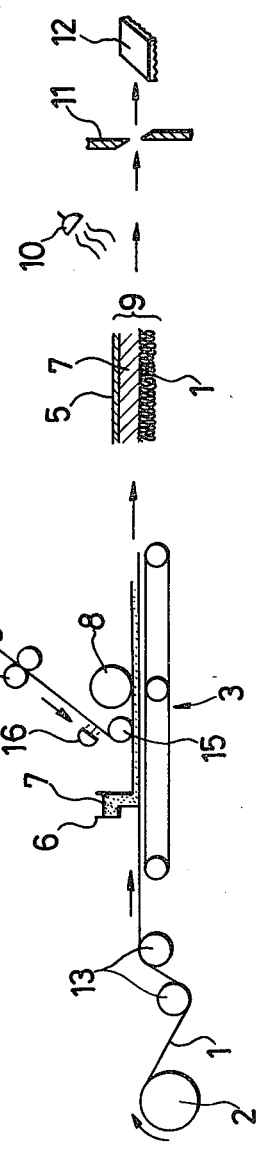
FIG. 8a
FIG. 8b

METHOD OF MAKING A CARPET TILE

This is a continuation of application Ser. No. 254,044 filed Apr. 14, 1981, now abandoned.

BACKGROUND OF THE INVENTION

1. Field of the Invention

This invention relates to a method of making a carpet tile.

2. Description of the Prior Art

A carpet tile is produced such that a thermoplastic backing composition is laminated for backing on the back of various kinds of carpet to a specified thickness, a secondary backing fabric is then laminated thereonto, and the laminated fabric is cooled and cut or stamped out as required. Carpet tiles have square, rectangular, rhombic, or even more complicated shapes, and each provides a plate-like carpet having an area roughly in the range of from 0.05 to 2 $m^2$. These carpet tiles are combined on a floor to provide a carpet without forming any clearance, and they are advantageous over ordinary types of carpets in that by merely fixing them onto a floor there can be formed a carpet easily and in that carpets of various impressions can be obtained by changing the combination of shape and color of carpet tiles.

It is necessary that when laid on a floor these tile carpets should be fixed to the floor tightly enough to prevent them from partially coming off on walking thereon. As means for satisfying this requirement there is known the use of an adhesive or sticking agent, or the use of needles or tacks. These methods, however, are disadvantageous in that their application is troublesome and the replacement of the carpet tiles laid on the floor by such methods takes more time and labor. As an improvement over such methods there is known the method in which a carpet tile itself is made heavier by the application of a backing material so that it has fixativity (laying stability). The backing material is also intended to prevent the constituent threads of a carpet tile from coming off, to make the carpet tile dimensionally stable and to make it cushiony.

Thus, carpet tile backing materials must have a laying stability which allows the backed carpet tile to become stably fixed upon laying on a floor, and they must also satisfy the requirements of backing materials for ordinary type carpets. Moreover, this laying stability is required to be imparted without using expensive materials.

SUMMARY OF THE INVENTION

An object of this invention is to provide a method of making a carpet tile for satisfying the above-described requirements which is capable of attaining the improvements in the quality and productivity of the product by correcting accurately unfavorable phenomena such as the meandering, sag development of wrinkles, and the like of a running belt-like carpet and a secondary backing fabric during the lamination step.

Another object of this invention is to provide a method of making a carpet tile with excellent properties and dimensional stability, which further comprises a step of preheating the secondary backing fabric in the course of running of the secondary backing fabric.

The aforesaid objects of this invention are achieved, in a method of making a carpet tile which comprises laminating for backing on a carrying conveyor a thermoplastic backing composition onto a belt-like carpet fed from a carpet feed section by the conveyor to form a thermoplastic backed layer, laminating a secondary backing fabric fed from a secondary backing fabric feed section onto the thermoplastic backed layer by a pressure roll to form a carpet belt material, cooling the laminated carpet belt material, and cutting it to size as required, an improvement which comprises allowing the belt-like carpet to pass through a roll guider in the running direction thereof upstream of the conveyor, and simultaneously allowing the secondary backing fabric to pass through a cloth guider in the running direction thereof; and, in the aforesaid method of making a carpet tile, by an improvement which comprises allowing the secondary backing fabric to pass through the cloth guider, and then allowing the secondary backing fabric to pass through an expander roll at a position upstream and adjacent to the pressure roll.

The aforesaid objects of this invention are also achieved, in a method of making a carpet tile which comprises laminating for backing on a carrying conveyor a thermoplastic backing composition onto a belt-like carpet fed from a carpet feed section by the conveyor to form a thermoplastic backed layer, laminating a secondary backing fabric fed from a secondary backing fabric feed section onto the thermoplastic backed layer by a pressure roll to form a carpet belt material, cooling the laminated carpet belt material, and cutting it to size as required, by an improvement which comprises allowing the belt-like carpet to pass through a roll guider in the running direction thereof upstream of the conveyer, simultaneously allowing the secondary backing fabric to pass through a cloth guider in the running direction thereof, and preheating the back base fabric in the course of the running of the secondary backing fabric; and, in the aforesaid method of making a carpet tile, by an improvement which comprises allowing the secondary backing fabric to pass through a cloth guider, and then allowing the secondary backing fabric to pass through an expander roll at a position upstream and adjacent to the pressure roll.

As described above, the method of making a carpet tile according to the present invention is characterized in that the respective elements for lamination are guided so that the respective elements to be processed may properly be aligned at lamination positions.

BRIEF DESCRIPTION OF THE DRAWINGS

In the accompanying drawings

FIG. 1 is a flow diagram showing a method of making a carpet tile according to the conventional method.

FIGS. 4a, 4b, and 4c are operational diagrams of a roll guider.

FIG. 8a and FIG. 8b are flow diagrams showing a second embodiment of a method of making a carpet tile according to the present invention.

DETAILED DESCRIPTION OF THE INVENTION

Figure 2A:
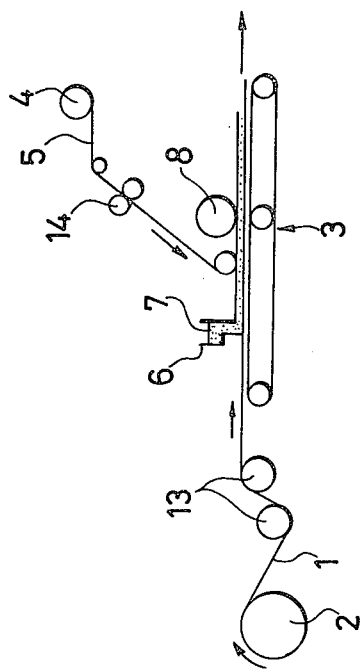
FIG. 2a and FIG. 2b are flow diagrams showing a first embodiment of a method of making a carpet tile according to the present invention.
Figure 2A:
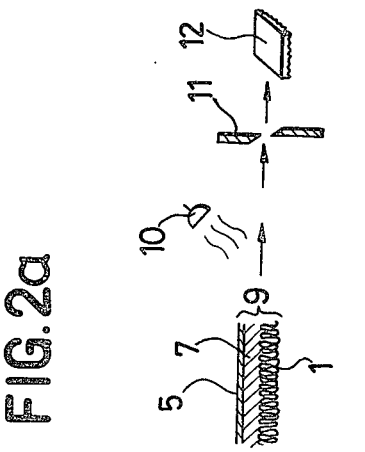

Specific examples of the method of making a carpet tile according to the present invention will be illustrated below with reference to the attached drawings.

FIG. 1 is a flow diagram showing a fundamental process operation of the method of making a carpet tile according to the conventional method. In FIG. 1, a belt-like carpet 1 drawn for running from a belt-like carpet feed section 2 (for example, a roll carpet) by a carrying means 3 (a conveyer) is coated with the backing material to a specified thickness by the use of a coater 6 arranged over the running raw fabric on the carrying conveyer section and containing a thermoplastic backing, composition 7, a secondary backing fabric 5 guided in parallel to an upper surface of the backing material through a roller from a secondary backing fabric feed section 4 (for example, a roll) is laminated by a pressure roll onto the upper surface of the backing material to form a laminated carpet belt material 9 with specified thickness and properties, and in the following step the laminated carpet belt material 9 is passed through a cooling apparatus 10 and cut by a cutting device 11 to size to obtain a carpet tile product 12.

One of the matters requiring an extremely high consideration for the maintenance of the quality of the product in a series of steps such as described above is that the running belt-like carpet and the secondary backing fabric must maintain a specified width accurately and be at a complete center alignment state in the processing section. As anticipated from FIG. 1, the belt-like carpet and the secondary backing fabric pass a rather long running distance, and the initial rolled state of the carpet roll and secondary backing fabric is not always of a complete center alignment, so that such unfavorable phenomena as the meandering, center deviation, shrinkage in width, development of wrinkles, etc. of the carpet and the secondary backing fabric inevitably take place in the course to the lamination section with the result that the quality of the carpet tile product is not only degraded, but also there is interference with the accurate lamination operation, and consequently the following processing of the product is accompanied by inefficient operations, resulting in an increase in the price of the product.

As shown in FIG. 2a, the present invention provides a method of making a carpet tile capable of overcoming the aforesaid unfavorable phenomena resulting from the apparatus for the conventional method by:

(1) allowing the carpet to pass through the roll guider 13 upstream of the conveyer section 3 in the running step of the belt-like carpet, and by (2) allowing the secondary backing fabric to pass through a cloth guider 14 at an appropriate position upstream of the pressure roll 8 in the running step of the secondary backing fabric.

Figure 2B:
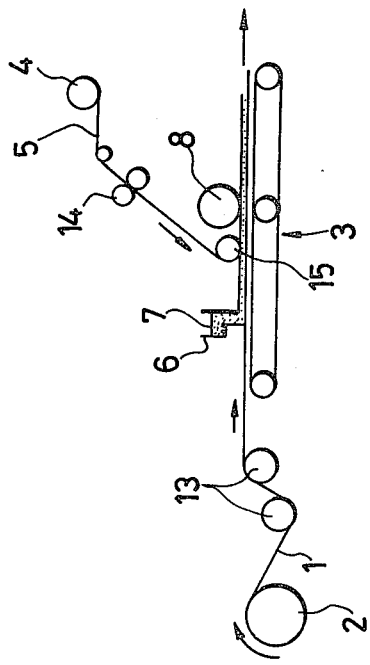
Figure 2B:
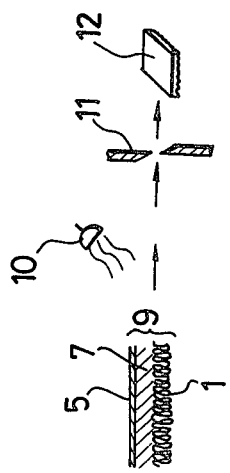

As in FIG. 2b, the present invention further provides a method of making a carpet tile capable of overcoming the aforesaid unfavorable phenomena resulting from the apparatus for the conventional method by:

(1) allowing the carpet to pass through the roll guider 13 upstream of the conveyer section 3 in the running step of the belt-like carpet, by (2) allowing the secondary backing fabric to pass through the expander roll upstream and adjacent to the pressure roll 8, and by (3) allowing the secondary backing fabric to pass through the cloth guider 14 at an appropriate position upstream of the expander roll 15.

Figure 3:
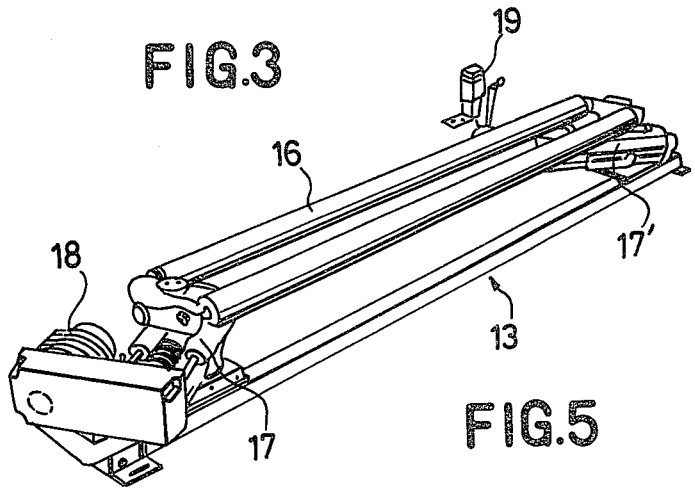
FIG. 3 is a perspective view showing an example of a roll guider.

FIG. 3 is a perspective view showing an example of a known roll guider for making corrections of the meandering of the belt-like carpet used in the method of the present invention. In FIG. 3, and in FIGS. 4a, 4b and 4c, when the carpet is running normally in position, the roll 16 remains stopped (FIG. 4b). When the carpet meanders either to the right or the left, the roll moves as being inclined due to the reciprocating motion of slide rails 17, 17'. The above-described operation is controlled by a detector signal to immediately maintain the carpet 1 in position and to make corrections of the meandering thereof. In FIG. 3, and in FIGS. 4a, 4b, and 4c, 18 represents a drive motor, and 19 represents a detector.

Figure 5:
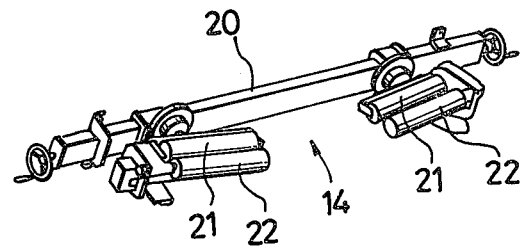
FIG. 5 is a perspective view showing an example of a cloth guider.

FIG. 5 shows an example of a known cloth guider 14 used in the method of the present invention. As shown in FIG. 5, the cloth guider 14 is composed of a pair of sets of an operating roll 21, and is capable of correcting accurately the meandering of the secondary backing fabric 5 in addition to its function for cloth opening and for taking wrinkles out of the secondary backing fabric. Various types of driving means such as the electrical type, air pressure type, etc. have been used for the drive of the operating roll.

Figure 6:
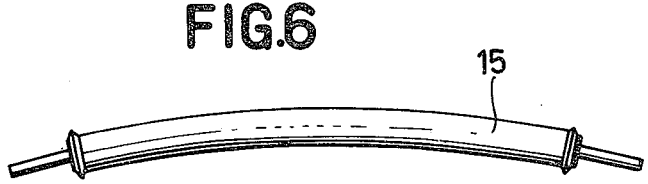
FIG. 6 is an elevation of an example of an expander roll.
Figure 7:
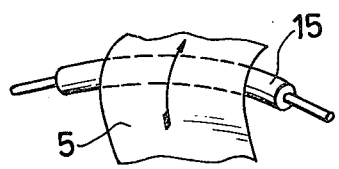
FIG. 7 is an operational view showing an application of an expander roll.

FIG. 6 shows a rubber expander roll as an example of a known expander roll used in the method of making of the present invention. In FIG. 6, a structure of a soft flexible rubber is formed around a curved axis. As shown in FIG. 7, the expander roll is set so that the secondary backing fabric may be introduced on the concave side of the curved axis, and may be taken out on the convex side thereof. Thus, the expander roll performs a cloth opening operation, sag correction of the secondary backing fabric, correction of wavy edges, and control of irregular tension.

Other examples of the method of making a carpet tile according to the present invention will be illustrated with reference to FIG. 8a and FIG. 8b.

FIG. 8a is a flow diagram showing another embodiment of an improved method of making a carpet tile according to the present invention, and particularly shows a method of making a carpet tile in which a carpet 1 drawn for running from a carpet feed section 2 by a carrying conveyer 3 is coated with the backing material to a specified thickness by the use of a coater 6 arranged over the running carpet on the carrying conveyer section and containing a thermoplastic backing composition 7, a secondary backing fabric 5 allowed to pass through a cloth guider 14 from a secondary backing fabric feed section 4, preheated by a heater 16, and guided in parallel to an upper surface of the backing material is laminated by a pressure roll 8 onto the upper surface of the backing material to form a laminated carpet belt material 9 with specified thickness and properties, and in the following step the laminated carpet belt material 9 is passed through a cooling apparatus 10 and cut by a cutting device 11 to size to obtain a carpet tile 12 as desired.

FIG. 8b is a flow diagram showing an embodiment of the method of making a carpet tile according to the present invention, in which in the aforesaid method of making a carpet tile, the secondary backing fabric 5 is allowed to pass through the cloth guider 14, and then allowed to pass through an expander roll 15 upstream and adjacent to the pressure roll 8, resulting in much better effects on the lamination operation of the secondary backing fabric.

The essential features of the methods of making a carpet tile as shown in FIG. 8a and FIG. 8b are that preheating of the secondary backing fabric to a predetermined temperature in the running course of the secondary backing fabric gives steadiness on the lamination operation by the following pressure roll and ensures the formation of a steady backing layer.

Further, in laminating the carpet, the thermoplastic backing material composition, and the secondary backing fabric, in the case where the temperature of the roll itself is increased as the pressure roll 8 is being used, with the result that the thermoplastic backing material composition oozes out on the surface of the carpet, and the quality of the product is degraded, the pressure roll may be maintained at temperatures below 40° C., preferably of 20° to 30° C. by an appropriate means, such as an internally water-cooling means, etc.

The temperature at the expander roll section due to preheating of the secondary backing fabric at the position where the expander roll is equipped or at a position upstream and adjacent thereto is preferably maintained at a temperature of from 40° to 100° C., more preferably 50° to 70° C. The preheating means employed may be selected from any arbitrary means such as an electric heating means, a hot air heating means, etc, the secondary backing fabric preferably being heated uniformly all over the width.

The present invention can provide a method of making a carpet tile of high quality which is capable of laminating in correct alignment therewith the carpet and the secondary backing fabric in the step of laminating the belt-like carpet, the thermoplastic backing composition and the secondary backing fabric, and steadifying the lamination processing without the necessity of making corrections of the product.

By providing the aforesaid heating process, the present invention can achieve remarkable effects on close opening operation, sag correction and adequate laminating operation of the secondary backing fabric at the expander roll section and following pressure roll section.

Any known thermoplastic backing compositions may be used as the thermoplastic backing composition of the present invention. Preferable examples of the thermoplastic backing composition include asphalt, ethylenepolar monomer copolymers, crystalline polyolefins, non-crystalline polyolefins, petroleum resin, polyterpene resin, styrene resin, rosin, and lower unsaturated rubber, those mainly composed of a mixture thereof, and those further containing filler as disclosed, for example, in Japanese patent application public disclosure Nos. 57085/1974, 6127/1975, 112591/1975, 125829/1979, 142644/1980 and Netherlands Patent Appln. No. 8100980.

Among those materials above there are so-called asphalt based compositions prepared by incorporating the aforesaid resins, synthetic rubber, fillers, etc. into the so-called petroleum asphalt such as straight asphalt, blown asphalt, asphalt prepared by the solvent deasphalting process, etc.

The roll guider, cloth guider, and expander roll in the present invention may be selected from the conventional ones.

What is claimed is:

1. In a method of making an asphaltic composition-backed carpet tile including feeding a carpet onto a conveyor through a roll guider from a carpet feeding section, advancing the conveyor with the carpet along a feedpath, directing a heated thermoplastic asphaltic composition backing onto the carpet as it is fed along the conveyor and applying it to the carpet so as to form an asphaltic composition-backed carpet on the conveyor, feeding a secondary backing fabric through a cloth guider along its course of running from a secondary backing fabric feed section onto the asphaltic composition-backed carpet and pressing them together by a pressure roll to form a laminated carpet belt material, cooling the laminated carpet belt material and cutting it into selected lengths, the improvement which comprises preheating said secondary backing fabric in the course of the running of said fabric, by a heater at a position upstream of said pressure roll, and thereafter passing said preheated fabric through an expander roll at a position downstream of the heater and upstream and adjacent to said pressure roll for opening and removing wrinkles from said preheated fabric by the expander roll prior to the pressing together of said fabric and said asphaltic composition-backed carpet by said pessure roll.

2. The improvement according to claim 1, wherein the secondary backing fabric is maintained at a preheating temperatue of from 40°–100° C. and the pressure roll is maintained at a temperature below 40° C.

* * * * *